US012046191B2

(12) United States Patent
Chae

(10) Patent No.: US 12,046,191 B2
(45) Date of Patent: Jul. 23, 2024

(54) DATA DRIVER CIRCUIT AND DISPLAY DEVICE HAVING THE SAME

(71) Applicant: SAMSUNG DISPLAY CO., LTD., Yongin-si (KR)

(72) Inventor: Se-Byung Chae, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/463,935

(22) Filed: Sep. 8, 2023

(65) Prior Publication Data

US 2023/0419888 A1 Dec. 28, 2023

Related U.S. Application Data

(63) Continuation of application No. 18/145,287, filed on Dec. 22, 2022, now Pat. No. 11,862,074.

(30) Foreign Application Priority Data

Dec. 24, 2021 (KR) ........................ 10-2021-0187789

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01);
(Continued)

(58) Field of Classification Search
CPC ............. G09G 3/32; G09G 2300/0842; G09G 2310/0267; G09G 2310/0275; G09G 2330/021; G09G 2330/028
See application file for complete search history.

(56) References Cited

U.S. PATENT DOCUMENTS 9,324,274 B2 4/2016 Kim
9,786,245 B2 10/2017 Lee et al.
(Continued)

FOREIGN PATENT DOCUMENTS

KR 10-1311300 9/2013
KR 1020140050268 4/2014
(Continued)

OTHER PUBLICATIONS

Notice of Allowance dated Jun. 8, 2023 in corresponding U.S. Appl. No. 18/145,287.

*Primary Examiner* — Andrew Sasinowski
(74) *Attorney, Agent, or Firm* — F. Chau & Associates, LLC

(57) ABSTRACT

Disclosed is a data driving circuit including a noise filter, first through third voltage generators, and an output circuit. The noise filter receives a driving voltage and removes noise from the driving voltage to output a filtered driving voltage. The first voltage generator outputs a first voltage, a second voltage, and a third voltage. The second voltage generator generates a first reference voltage based on the filtered driving voltage, the first voltage, and the second voltage. The third voltage generator generates a second reference voltage based on the filtered driving voltage, the second voltage, and the third voltage. The output circuit outputs a data signal of a voltage level corresponding to an image signal based on the first reference voltage and the second reference voltage.

20 Claims, 9 Drawing Sheets

(52) U.S. Cl.
CPC ............... *G09G 2310/0275* (2013.01); *G09G 2330/021* (2013.01); *G09G 2330/028* (2013.01)

(56) References Cited

U.S. PATENT DOCUMENTS

| | | | | |
|---|---|---|---|---|
| 2013/0026313 | A1* | 1/2013 | Morrow ................. | F16M 11/38 248/164 |
| 2016/0026313 | A1 | 1/2016 | Morein et al. | |
| 2017/0032758 | A1 | 2/2017 | Park et al. | |
| 2019/0019449 | A1* | 1/2019 | Pappas ..................... | G09G 3/32 |
| 2019/0197930 | A1 | 6/2019 | Kim et al. | |
| 2020/0118492 | A1* | 4/2020 | Meng ................... | G09G 3/3233 |
| 2023/0206828 | A1* | 6/2023 | Chae ........................ | G09G 3/32 345/55 |

FOREIGN PATENT DOCUMENTS

| | | |
|---|---|---|
| KR | 1020150081848 | 7/2015 |
| KR | 1020170015752 | 2/2017 |

* cited by examiner

DATA DRIVER CIRCUIT AND DISPLAY DEVICE HAVING THE SAME

CROSS-REFERENCE TO RELATED APPLICATIONS

This U.S. non-provisional patent application is a continuation of U.S. patent application Ser. No. 18/145,287 filed Dec. 22, 2022, which claims priority under 35 U.S.C. § 119 to Korean Patent Application No. 10-2021-0187789 filed on Dec. 24, 2021, in the Korean Intellectual Property Office, the disclosures of which are incorporated by reference in their entirety herein.

1. TECHNICAL FIELD

Embodiments of the present disclosure described herein relate to a display device.

2. DISCUSSION OF RELATED ART

An electronic device such as a smart phone, a digital camera, a notebook computer, a navigation system, a monitor, and a smart television that provides images to a user includes a display device for displaying the images. The display device generates an image and provides the user with the generated image through a display screen.

The display device includes a plurality of pixels and driving circuits for controlling the plurality of pixels. Each of the plurality of pixels includes a light emitting element and a pixel circuit for controlling the light emitting element. The pixel circuit may include a plurality of transistors connected to one another.

The driving circuits may apply data signals to the pixels to display a predetermined image as a current corresponding to the data signal supplied to the light emitting elements of the pixels. The data signals may be generated based on a reference voltage provided by a data driving circuit. However, if the reference voltage is noisy, the image quality of the display device may be reduced.

SUMMARY

At least one embodiment of the present disclosure provides a data driving circuit for generating a reference voltage in conjunction with a driving voltage, and a display device.

According to an embodiment, a data driving circuit includes a noise filter, a first voltage generator, a second voltage generator, a third voltage generator, and an output circuit. The noise filter receives a driving voltage and removes a noise from the driving voltage to output a filtered driving voltage. The first voltage generator outputs a first voltage, a second voltage, and a third voltage. The second voltage generator generates a first reference voltage based on the filtered driving voltage, the first voltage, and the second voltage. The third voltage generator generates a second reference voltage based on the filtered driving voltage, the second voltage, and the third voltage. The output circuit that outputs a data signal of a voltage level corresponding to an image signal based on the first reference voltage and the second reference voltage.

In an embodiment, the noise filter may include a resistor connected between an input terminal for receiving the driving voltage and an output node at which the filtered driving voltage is output and a capacitor connected between the output node and a ground terminal.

In an embodiment, the second voltage generator may include an operational amplifier including a first input terminal and a second input terminal, a first resistor connected between the first input terminal and a first voltage output terminal at which the first voltage is output, a second resistor connected between the first input terminal and an output node at which the filtered driving voltage is output, a third resistor connected between the second input terminal and a first node at which the second voltage is output, and a fourth resistor connected between the second input terminal and a first reference voltage output terminal.

In an embodiment, the third voltage generator may include an operational amplifier including a first input terminal and a second input terminal, a fifth resistor connected between the first input terminal and a third voltage output terminal at which the third voltage is output, a sixth resistor connected between the first input terminal and an output node at which the filtered driving voltage is output, a seventh resistor connected between the second input terminal and a first node at which the second voltage is output, and an eighth resistor connected between the second input terminal and a second reference voltage output terminal.

In an embodiment, the noise filter may include a plurality of inverters connected between an input terminal for receiving the driving voltage and an output node at which the filtered driving voltage is output.

In an embodiment, the noise filter may include a plurality of resistors, a first switching circuit that selects at least one of the plurality of resistors so as to be connected between an input terminal for receiving the driving voltage and an output node at which the filtered driving voltage is output, a plurality of capacitors, and a second switching circuit that selects at least one of the plurality of capacitors so as to be connected between a ground terminal and the output node at which the filtered driving voltage is output.

In an embodiment, the noise filter may include a plurality of inverter strings and a switching circuit that selects at least one of the plurality of inverter strings so as to be connected between an input terminal for receiving the driving voltage and an output node at which the filtered driving voltage is output.

In an embodiment, each of the plurality of inverter strings may include a plurality of inverters sequentially connected in series. Each of the plurality of inverter strings may include different numbers of the plurality of inverters.

According to an embodiment, a display device includes a display panel, a scan driving circuit, a data driving circuit, a driving controller, and a power manager. The display panel includes a pixel connected to a scan line and a data line. The scan driving circuit us configured to drive the scan line. The data driving circuit receives an image signal and outputs a data signal corresponding to the image signal to the data line. The driving controller controls the scan driving circuit and the data driving circuit and outputs the image signal. The power manager provides a driving voltage to the display panel and the data driving circuit. The data driving circuit includes a noise filter that receives a driving voltage and removes a noise from the driving voltage to output a filtered driving voltage. The first voltage generator outputs a first voltage, a second voltage, and a third voltage. The second voltage generator generates a first reference voltage based on the filtered driving voltage, the first voltage, and the second voltage. The third voltage generator generates a second reference voltage based on the filtered driving voltage, the second voltage, and the third voltage. The output circuit outputs the data signal of a voltage level corresponding to the image signal based on the first reference voltage and the second reference voltage.

In an embodiment, the noise filter may include a resistor connected between an input terminal for receiving the driving voltage and an output node at which the filtered driving voltage is output and a capacitor connected between the output node and a ground terminal.

In an embodiment, the second voltage generator may include an operational amplifier including a first input terminal and a second input terminal, a first resistor connected between the first input terminal and an output terminal at which the first voltage is output, a second resistor connected between the first input terminal and an output node at which the filtered driving voltage is output, a third resistor connected between the second input terminal and a first node at which the second voltage is output, and a fourth resistor connected between the second input terminal and a first reference voltage output terminal.

In an embodiment, the third voltage generator may include an operational amplifier including a first input terminal and a second input terminal, a fifth resistor connected between the first input terminal and a third voltage output terminal at which the third voltage is output, a sixth resistor connected between the first input terminal and an output node at which the filtered driving voltage is output, a seventh resistor connected between the second input terminal and a first node at which the second voltage is output, and an eighth resistor connected between the second input terminal and a second reference voltage output terminal.

In an embodiment, the noise filter may include a plurality of inverters connected between an input terminal for receiving the driving voltage and an output node at which the filtered driving voltage is output.

In an embodiment, the noise filter may include a plurality of resistors, a first switching circuit that selects at least one of the plurality of resistors so as to be connected between an input terminal for receiving the driving voltage and an output node at which the filtered driving voltage is output, a plurality of capacitors, and a second switching circuit that selects at least one of the plurality of capacitors so as to be connected between a ground terminal and the output node at which the filtered driving voltage is output.

In an embodiment, the noise filter may include a plurality of inverter strings and a switching circuit that selects at least one of the plurality of inverter strings so as to be connected between an input terminal for receiving the driving voltage and an output node at which the filtered driving voltage is output.

In an embodiment, each of the plurality of inverter strings may include a plurality of inverters sequentially connected in series. Each of the plurality of inverter strings may include different numbers of the plurality of inverters.

In an embodiment, the display device may further include a flexible circuit board electrically connected to the display panel. The driving controller and the power manager may be disposed on the flexible circuit board.

In an embodiment, a level of the first reference voltage may a sum of the first voltage and a difference between the filtered driving voltage and the second voltage. A level of the second reference voltage may a sum of the third voltage and a difference between the filtered driving voltage and the second voltage.

In an embodiment, the pixel may include a light emitting element, a first transistor connected between a first electrode, which is electrically connected to a first driving voltage line for receiving the driving voltage, and a second electrode electrically connected to the light emitting element, and a second transistor connected between the data line and the first electrode of the first transistor and including a gate electrode connected to the scan line.

According to an embodiment, a data driving circuit includes a noise filter, a first voltage generator, a second voltage generator, and a third voltage generator. The noise filter is configured to receive a driving voltage and remove a noise from the driving voltage to output a filtered driving voltage. The first voltage generator is configured to output a first voltage, a second voltage greater than the first voltage, and a third voltage greater than the second voltage. The second voltage generator is configured to output a first reference voltage that is a sum of the first voltage and a difference between the filtered driving voltage and the second voltage. The third voltage generator configured to output a second reference voltage that is a sum of the third voltage and a difference between the filtered driving voltage and the second voltage. The data driving circuit outputs a data signal based on image data, the first reference voltage and the second reference voltage.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
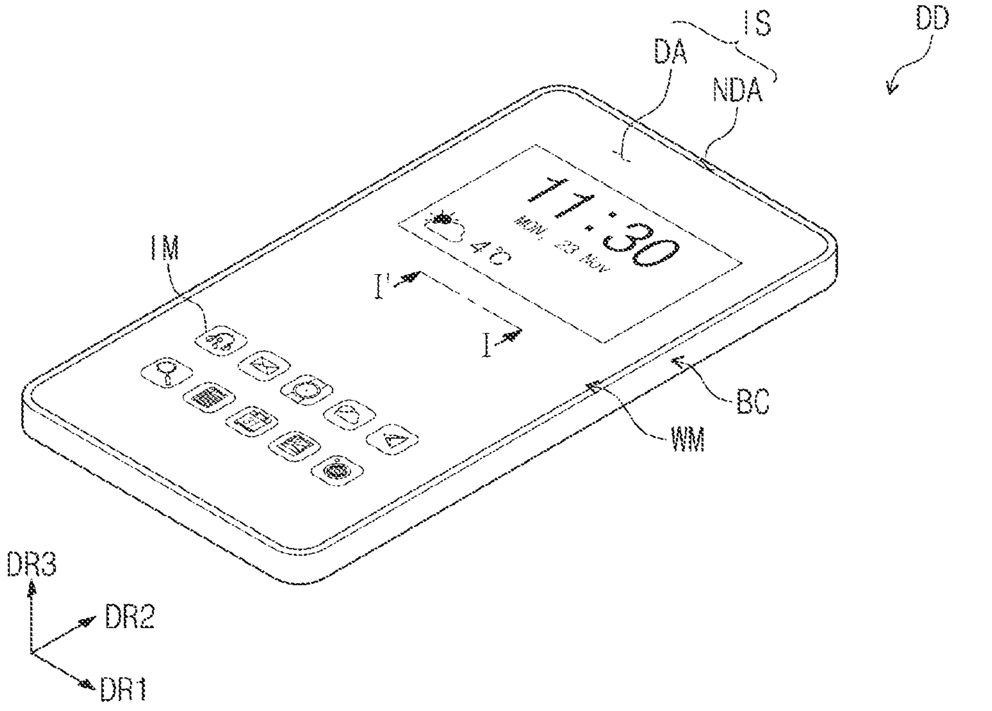
FIG. 1 is a perspective view of a display device, according to an embodiment of the present disclosure.

In the specification, the expression that a first component (or region, layer, part, etc.) is “on”, “connected with”, or “coupled with” a second component means that the first component is directly on, connected with, or coupled with the second component or means that a third component is interposed therebetween.

Like reference numerals refer to like components. Also, in drawings, the thickness, ratio, and dimension of components may be exaggerated for effectiveness of description of technical contents. The term “and/or” includes one or more combinations of the associated listed items.

The terms “first”, “second”, etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles “a,” “an,” and “the” are singular in that they have a single referent, but the use of the singular form in the specification should not preclude the presence of more than one referent.

Also, the terms “under”, “beneath”, “on”, “above”, etc. are used to describe a relationship between components illustrated in a drawing. The terms are relative and are described with reference to a direction indicated in the drawing.

It will be understood that the terms “include”, “comprise”, “have”, etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

FIG. 1 is a perspective view of a display device, according to an embodiment of the present disclosure.

Referring to FIG. 1, a portable terminal is illustrated as an example of a display device DD according to an embodiment of the present disclosure. The portable terminal may include a tablet personal computer (PC), a smartphone, a personal digital assistant (PDA), a portable multimedia player (PMP), a game console, a wristwatch-type electronic device, and the like. However, the present disclosure is not limited thereto. The present disclosure may be used for small and medium electronic devices such as a personal computer, a notebook computer, a kiosk, a car navigation unit, and a camera, in addition to large-sized electronic equipment such as a television or an outside billboard. The above embodiments are provided only as an example since the display device DD may be applied to other electronic device(s) without departing from the concept of the present disclosure.

As shown in FIG. 1, a display surface, on which an image IM is displayed, is parallel to a plane defined by a first direction DR1 and a second direction DR2. The display device DD includes a plurality of separate areas on the display surface. The display surface includes a display area DA, in which the image IM is displayed, and a non-display area NDA adjacent to the display area DA. The non-display area NDA may be referred to as a bezel area. In an embodiment, no image is displayed in the non-display area NDA or no pixels are present in the non-display area NDA. For example, the display area DA may have a rectangular shape. The non-display area NDA surrounds the display area DA. Also, although not illustrated, for example, the display device DD may have a shape that is partially curved. As a result, one area of the display area DA may have a curved shape.

A front surface (alternatively, an upper surface or a first surface) and a rear surface (alternatively, a lower surface or a second surface) of each of members are defined in a direction in which the image IM is displayed, that is, the third direction DR3. However, directions that the first, second, and third directions DR1, DR2, and DR3 indicate may be relative in concept and may be changed to different directions.

The display device DD according to an embodiment of the present disclosure may detect a user input applied from the outside. The user input includes various external inputs such as a touch of a part of a user’s body, light, heat, pressure, or the like.

Figure 2:
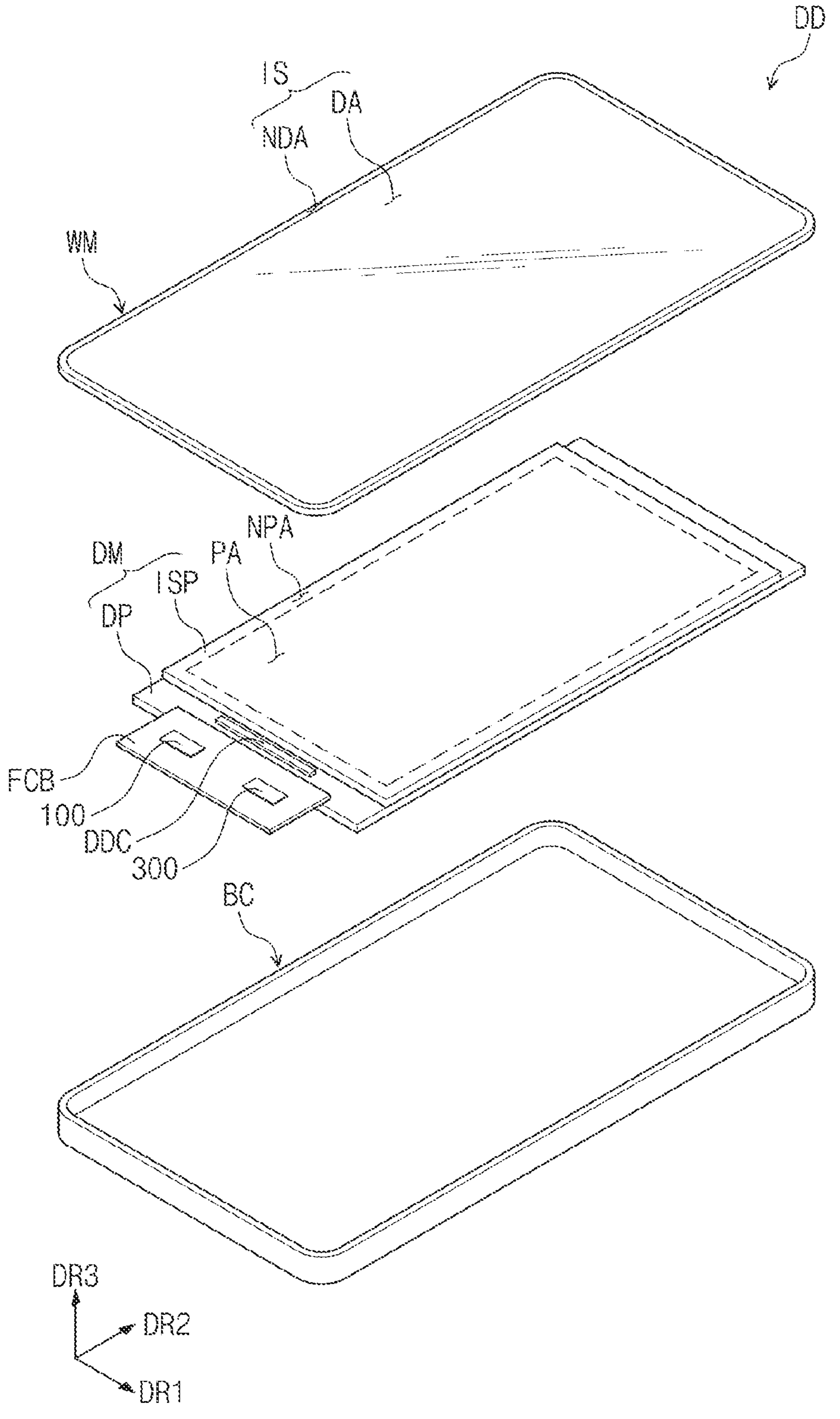
FIG. 2 is an exploded perspective view of a display device, according to an embodiment of the present disclosure.

FIG. 2 is an exploded perspective view of a display device, according to an embodiment of the present disclosure. FIG. 2 illustrates components of the display device DD simply to explain a stacked relationship between the components.

As shown in FIG. 2, the display device DD includes a window WM, a display module DM, and a lower case BC. The display module DM includes a display panel DP and an input sensing layer ISP.

According to an embodiment of the present disclosure, the display panel DP may include a light emitting display panel. For example, the display panel DP may be an organic light emitting display panel, an inorganic light emitting display panel, a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot, a quantum rod, or the like. Hereinafter, in an embodiment, the description is provided under the assumption that the display panel DP is an organic light emitting display panel.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. While the window WM is illustrated as being a single layer, embodiments of the disclosure are not limited thereto. For example, the window WM may include a plurality of layers.

The non-display area NDA of the display device DD described above may correspond to an area that is defined by printing a material including a given color on one area of the window WM. As an example of the present disclosure, the window WM may include a light blocking pattern for defining the non-display area NDA. The light blocking pattern that is a colored organic film may be formed, for example, in a coating manner.

The window WM may be coupled to the display module DM through an adhesive film. As an example of the present disclosure, the adhesive film may include an optically clear adhesive (OCA) film. However, the adhesive film is not limited thereto. For example, the adhesive film may include an adhesive or a sticking agent. For example, the adhesive film may include an optically clear resin (OCR) or a pressure sensitive adhesive (PSA) film.

An anti-reflection layer may be further interposed between the window WM and the display module DM. The anti-reflection layer decreases the reflectivity of external light incident from above the window WM. The anti-reflection layer according to an embodiment of the present disclosure may include a retarder and a polarizer. The retarder may be a film type or a liquid crystal coating type and may include a half-wavelength (λ/2) retarder and/or a quarter-wavelength (λ/4) retarder. The polarizer may be a film type or a liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. Also, the anti-reflection layer may further include a light blocking pattern.

The display module DM may display the image IM depending on an electrical signal and may transmit/receive information about an external input. The display module DM may be defined as a pixel area PA and a peripheral area NPA. The pixel area PA may be defined as an area through which the image IM provided from the display area DA is output. Also, the pixel area PA may be defined as an area in which the input sensing layer ISP senses an external input applied from the outside.

The peripheral area NPA is adjacent to the pixel area PA. For example, the peripheral area NPA may surround the pixel area PA. However, this is illustrated merely as an example. The peripheral area NPA may be defined in various shapes and is not limited to a specific embodiment. According to an embodiment, the pixel area PA of the display module DM may correspond to at least part of the display area DA.

The display module DM may further include a flexible circuit board FCB, a driving controller 100 (e.g., a control circuit), a data driving circuit DDC, and a power manager 300 (e.g., a power managing circuit such as a power management integrated circuit). The flexible circuit board FCB is connected to the display panel DP to electrically connect the display panel DP to the main circuit board MCB. The flexible circuit board FCB may include a plurality of driving elements. The plurality of driving elements may include the driving controller 100 for driving the display panel DP, and the power manager 300.

As an example of the present disclosure, the data driving circuit DDC is disposed on the display panel DP. However, the present disclosure is not limited thereto. In an embodiment, the data driving circuit DDC may be disposed on the flexible circuit board FCB. Moreover, the data driving circuit DDC may include at least one integrated circuit chip.

In an embodiment, the driving controller 100 and the power manager 300 may be disposed on a main circuit board, and the data driving circuit DDC may be disposed on the flexible circuit board FCB. In this case, the main circuit board may be electrically connected to the display panel DP through the flexible circuit board FCB.

In an embodiment, the driving controller 100 may be arranged on the display panel DP.

In an embodiment, the driving controller 100 and the data driving circuit DDC may be integrated onto a single chip.

Although not shown in FIG. 2, the display module DM may further include an input sensing circuit for controlling an input sensing layer.

Figure 3:
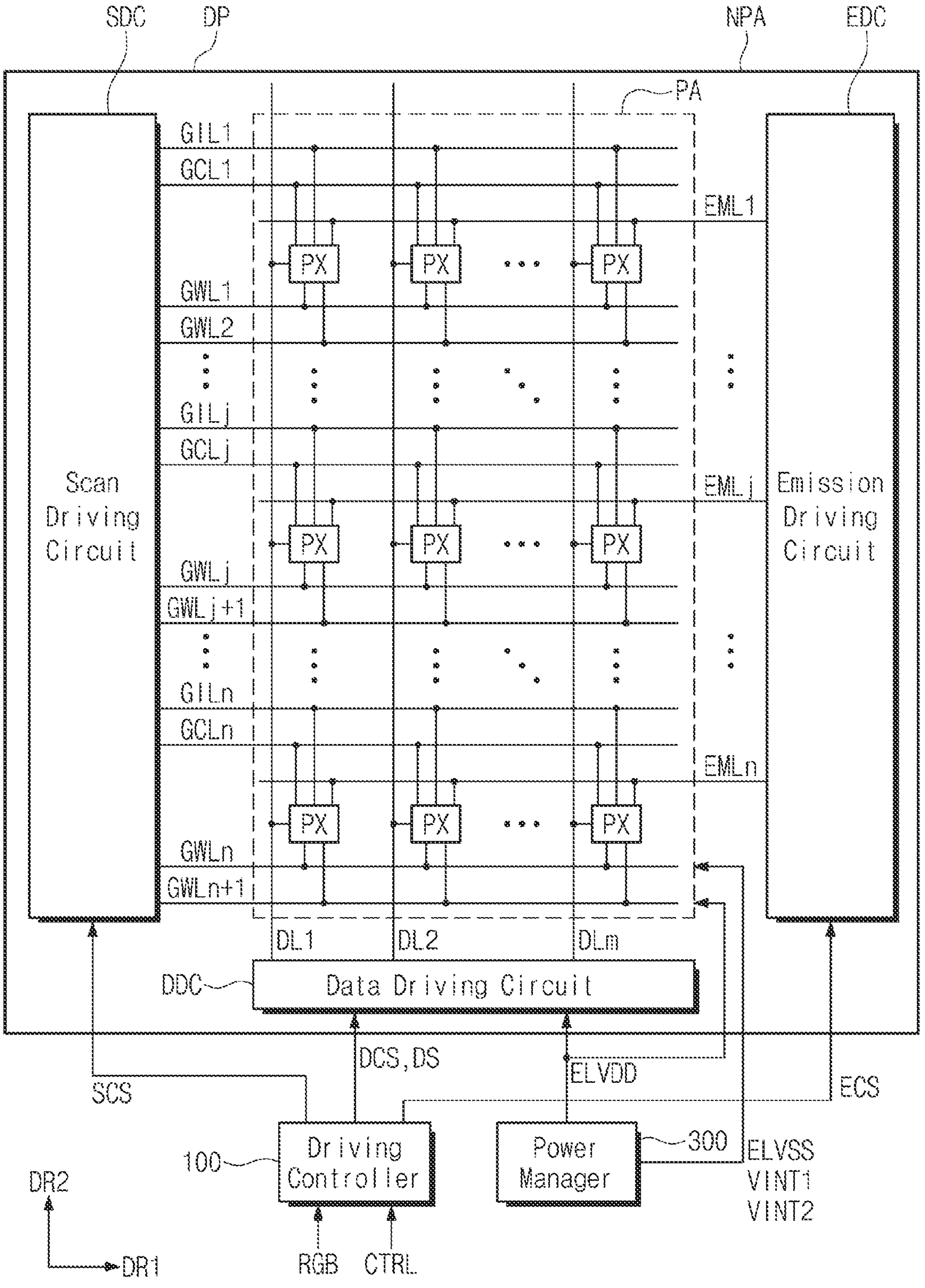
FIG. 3 is a block diagram of the display device shown in FIG. 1.

FIG. 3 is a block diagram of the display device shown in FIG. 1.

Referring to FIG. 3, the display device DD includes the display panel DP, the driving controller 100, and the power manager 300.

The driving controller 100 receives an input image signal RGB and a control signal CTRL. The driving controller 100 outputs a scan control signal SCS, a data control signal DCS, an output image signal DS, and an emission control signal ECS.

The power manager 300 generates voltages used to operate the display panel DP. In an embodiment, the power manager 300 generates a first driving voltage ELVDD, a second driving voltage ELVSS, a first initialization voltage VINT1, and a second initialization voltage VINT2. In an embodiment, the power manager 300 may operate under the control of the driving controller 100. In an embodiment, the second driving voltage ELVSS is less than the first driving voltage ELVDD.

The display panel DP includes scan lines GIL1 to GILn, GCL1 to GCLn, and GWL1 to GWLn+1, light emitting control lines EML1 to EMLn, the data lines DL1 to DLm, and the pixels PX. A scan driving circuit SDC, an emission driving circuit EDC, and the data driving circuit DDC may be disposed on the display panel DP.

The scan driving circuit SDC may receive the scan control signal SCS from the driving controller 100 to drive the scan lines GIL1 to GILn, GCL1 to GCLn, and GWL1 to GWLn+1. The scan lines GIL1 to GILn, GCL1 to GCLn, and GWL1 to GWLn+1 may extend from the scan driving circuit SDC in the first direction DR1.

The emission driving circuit EDC may receive the emission control signal ECS from the driving controller 100 to drive the emission control lines EML1 to EMLn. The emission control lines EML1 to EMLn may extend from the emission driving circuit EDC in a direction opposite to the first direction DR1.

The data driving circuit DDC receives the data control signal DCS and the output image signal DS from the driving controller 100. The data driving circuit DDC converts the output image signal DS into data signals and then outputs the data signals to a plurality of data lines DL1 to DLm to be described later. In an embodiment, the data signals are analog voltages corresponding to a grayscale level of the output image signal DS. For example, the output image signal DS may include a grayscale for each pixel PX of the display panel DP.

The scan lines GIL1 to GILn, GCL1 to GCLn, and GWL1 to GWLn+1 and the emission control lines EML1 to EMLn are arranged spaced from one another in the second direction DR2. The data lines DL1 to DLm may extend from the data driving circuit DDC in a direction opposite to the second direction DR2, and may be are arranged spaced from one another in the first direction DR1.

In an embodiment, the scan driving circuit SDC, the emission driving circuit EDC, and the data driving circuit DDC may be positioned in the non-pixel area NPA of the display panel DP, and may be respectively arranged on a first side, a second side, and a third side of the display panel DP. In an embodiment, the first side may be the non-pixel area NPA adjacent to a left side of the pixel area PA; the second side may be the non-pixel area NPA adjacent to a right side of the pixel area PA; and, the third side may be the non-pixel area NPA adjacent to a lower side of the pixel area PA. However, the present disclosure is not limited thereto.

In the example shown in FIG. 3, the scan driving circuit SDC and the emission driving circuit EDC are arranged to face each other with the pixels PX interposed therebetween, but the present disclosure is not limited thereto. For example, the scan driving circuit SDC and the emission driving circuit EDC may be positioned adjacent to each other on one of the first side and the second side of the display panel DP. In an embodiment, the scan driving circuit SDC and the emission driving circuit EDC may be implemented with a single circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as shown in FIG. 3, a first row of pixels may be connected to the scan lines GIL1, GCL1, GWL1, and GWL2 and the emission control line EML1. Furthermore, the j-th row of pixels may be connected to the scan lines GILj, GCLj, GWLj, and GWLj+1 and the emission control line EMLj.

The plurality of pixels PX may be positioned in the pixel area PA.

Each of the plurality of pixels PX includes a light emitting element ED (see FIG. 4) and a pixel circuit PXC (see FIG. 4) for controlling the light emission of the light emitting element ED. The pixel circuit PXC may include one or more transistors and one or more capacitors. The scan driving circuit SDC and the emission driving circuit EDC may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the power manager 300. The first driving voltage ELVDD may be higher than the second driving voltage ELVSS.

The data driving circuit DDC according to an embodiment receives the first driving voltage ELVDD from the power manager 300 to generate a first reference voltage and a second reference voltage that are used to drive the data lines DL1 to DLm. The specific circuit configuration and operation of the data driving circuit DDC will be described in detail later.

Figure 4:
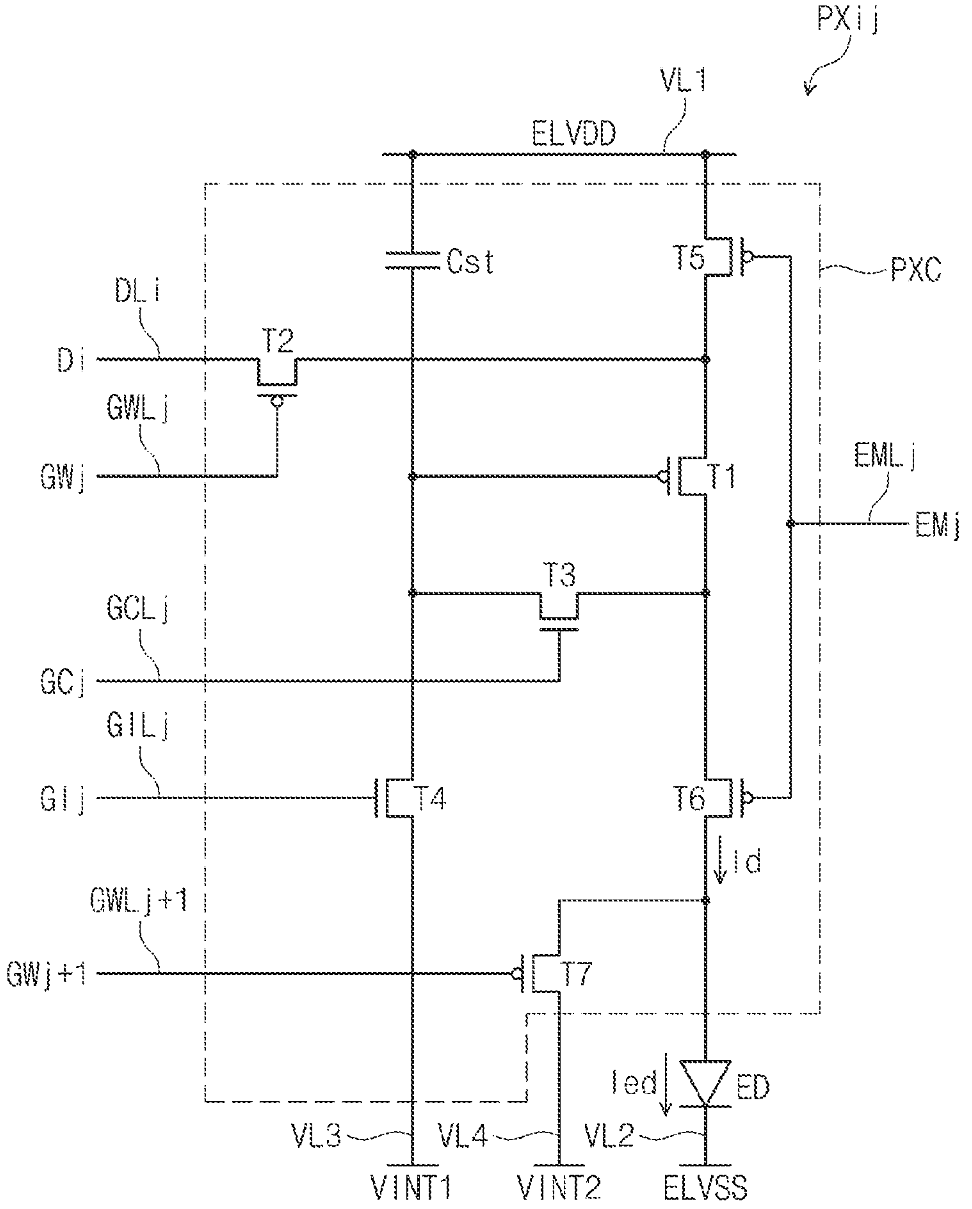
FIG. 4 is a circuit diagram of a pixel, according to an embodiment of the present disclosure.

FIG. 4 is a circuit diagram of a pixel, according to an embodiment of the present disclosure.

FIG. 4 illustrates an equivalent circuit diagram of a pixel PXij connected to the i-th data line DLi among the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th emission control line EMLj among the emission control lines EML1 to EMLn, which are illustrated in FIG. 3.

Each of the plurality of pixels PX shown in FIG. 3 may have the same circuit configuration as the equivalent circuit diagram of the pixel PXij shown in FIG. 4.

Referring to FIG. 4, the pixel PXij of a display device according to an embodiment includes the pixel circuit PXC and the at least one light emitting element ED. In an embodiment, the light emitting element ED may be a light emitting diode. In an embodiment, it is described that the one pixel PXij includes the one light emitting element ED. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors by using an oxide semiconductor as a semiconductor layer. Each of the first, second, fifth, sixth, and seventh transistors T1, T2, T5, T6, and T7 is a P-type transistor having a low-temperature polycrystalline silicon (LTPS) semiconductor layer. However, the present disclosure is not limited thereto, and all of the first to seventh transistors T1 to T7 may be P-type transistors or N-type transistors. In an embodiment, at least one of the first to seventh transistors T1 to T7 may be an N-type transistor, and the remaining transistors may be P-type transistors. Moreover, the circuit configuration of a pixel according to an embodiment of the present disclosure is not limited to FIG. 4. The pixel circuit PXC illustrated in FIG. 4 is merely an example. For example, the configuration of the pixel circuit PXC may be modified and implemented.

The scan lines GILj, GCLj, GWLj, and GWLj+1 may deliver scan signals GIj, GCj, GWj, and GWj+1, respectively. The emission control line EMLj may deliver an emission control signal EMj. The data line DLi delivers a data signal Di. The data signal Di may have a voltage level corresponding to the image signal RGB input to the display device DD (see FIG. 3). First to fourth driving voltage lines VL1, VL2, VL3, and VL4 may deliver the first driving voltage ELVDD, the second driving voltage ELVSS, the first initialization voltage VINT1, and the second initialization voltage VINT2, respectively.

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Di delivered through the data line DLi depending on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the scan line GWLj. The second transistor T2 may be turned on in response to the scan signal GWj received through the scan line GWLj and then may deliver the data signal Di delivered from the data line DLi to the first electrode of the first transistor T1. For example, the scan signal GWj may be applied to a gate electrode of the second transistor T2.

The third transistor T3 includes a first electrode connected to the gate electrode of the first transistor T1, a second electrode connected to the second electrode of the first transistor T1, and a gate electrode connected to the scan line GCLj. The third transistor T3 may be turned on in response to the scan signal GCj received through the scan line GCLj, and thus, the gate electrode and the second electrode of the first transistor T1 may be connected, that is, the first transistor T1 may be diode-connected. For example, the scan signal GCj may be applied to a gate electrode of the third transistor T3.

The fourth transistor T4 includes a first electrode connected to the gate electrode of the first transistor T1, a second electrode connected to the third driving voltage line VL3 through which the first initialization voltage VINT1 is supplied, and a gate electrode connected to the scan line GILj. The fourth transistor T4 may be turned on in response to the scan signal GIj received through the scan line GILj and then may perform an initialization operation of initializing a voltage of the gate electrode of the first transistor T1 by supplying the first initialization voltage VINT1 to the gate electrode of the first transistor T1. For example, the scan signal GIj may be applied to a gate electrode of the fourth transistor T4.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 may be simultaneously turned on in response to the emission control signal EMj received through the emission control line EMLj. In this way, the first driving voltage ELVDD may be compensated through the first transistor T1 thus diode-connected and may be supplied to the light emitting element ED. For example, the emission control signal EMj may be applied to gate electrodes of the fifth transistor T5 and the sixth transistor T6.

The seventh transistor T7 includes a first electrode connected to the second electrode of the sixth transistor T6, a second electrode connected to the fourth driving voltage line VL4, and a gate electrode connected to the scan line GWLj+1. The seventh transistor T7 is turned on in response to the scan signal GWj+1 received through the scan line GWLj+1 and bypasses a current of the anode of the light emitting element ED to the fourth driving voltage line VL4. For example, the scan signal GWj+1 may be applied to a gate electrode of the seventh transistor T7.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2 that delivers the second driving voltage ELVSS. A structure of the pixel PXij according to an embodiment is not limited to the structure shown in FIG. 4. The number of transistors included in the one pixel PXij, the number of capacitors included in the one pixel PXij, and the connection relationship thereof may be variously modified.

Figure 5:
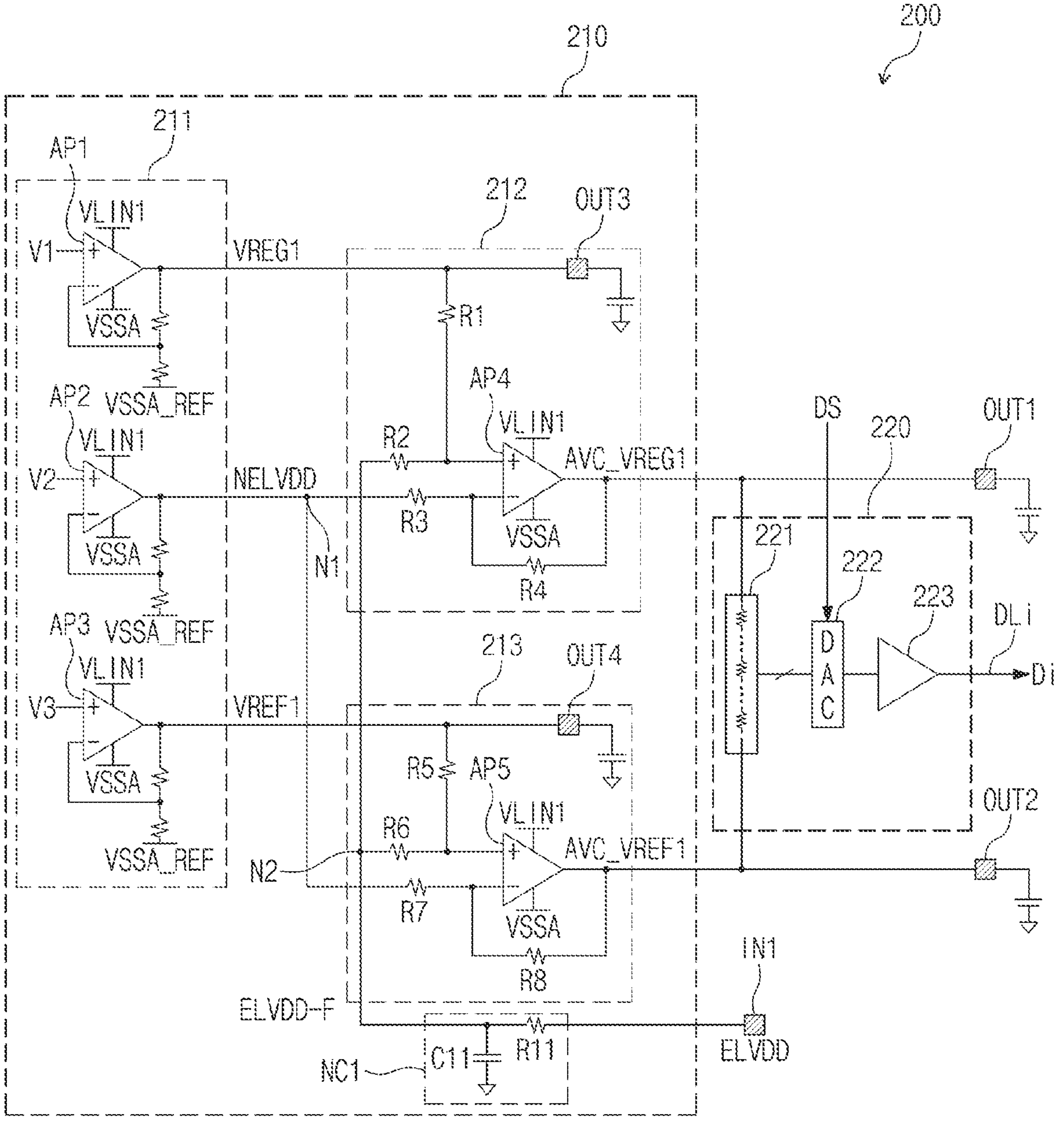
FIG. 5 is a circuit diagram of a data driving circuit, according to an embodiment of the present disclosure.

FIG. 5 is a circuit diagram of a data driving circuit, according to an embodiment of the present disclosure.

Referring to FIG. 5, a data driving circuit 200 includes a reference voltage generator 210 and an output circuit 220. The data driving circuit 200 may be used to implement the data driving circuit DDC of FIG. 3.

The reference voltage generator 210 receives the first driving voltage ELVDD from the power manager 300 shown in FIG. 3 and outputs a first reference voltage AVC_VREG1 and a second reference voltage AVC_VREF1. The first reference voltage AVC_VREG1 and the second reference voltage AVC_VREF1 are generated based on the first driving voltage ELVDD.

The reference voltage generator 210 includes a noise filter NC1 (e.g., a filtering circuit), a first voltage generator 211, a second voltage generator 212, and a third voltage generator 213.

The noise filter NC1 receives the first driving voltage ELVDD and outputs a filtered driving voltage ELVDD-F. In an embodiment, the noise filter NC1 outputs the filtered driving voltage ELVDD-F by removing low-frequency components included in the first driving voltage ELVDD. For example, components included in the first driving voltage less than a certain frequency or frequency range may be removed or attenuated by the noise filter NC1. In an embodiment, the noise filter NC1 is implemented by a high pass filter.

The noise filter NC1 may include a resistor R11 and a capacitor C11. The resistor R11 is connected between an input terminal IN1 and a second node N2. The capacitor C11 may be connected between the second node N2 and a ground terminal. The second node N2 may be an output node to which the filtered driving voltage ELVDD-F is output.

A cut-off frequency of the noise filter NC1 may be determined depending on a resistance value of the resistor R11 and the capacitance of the capacitor C11. Accordingly, the resistance value of the resistor R11 and the capacitance of the capacitor C11 may be set to be suitable for the characteristics of the display device DD. In an embodiment, the resistor R11 is a variable resistor whose resistance may be adjusted by a voltage output by the voltage generator 210 to change the cut-off frequency. In an embodiment, the capacitor C11 is a variable capacitor whose capacitance may be adjusted by a voltage output by the voltage generator 210 to change the cut-off frequency.

The circuit configuration of the noise filter NC1 is not limited to the embodiment of FIG. 5 and may be variously changed.

The first voltage generator 211 receives voltages V1, V2, V3, VLIN1, VSSA, and VSSA_REF and outputs a first voltage VREG1, a second voltage NELVDD, and a third voltage VREF1. The first voltage generator 211 may include operational amplifiers AP1, AP2, and AP3. The operational amplifiers AP1, AP2, and AP3 may output the first voltage VREG1, the second voltage NELVDD and the third voltage VREF1, respectively. In an embodiment, the first voltage VREG1, the second voltage NELVDD, and the third voltage VREF1 have different voltage levels from one another. In an embodiment, the first voltage VREG1, the second voltage NELVDD, and the third voltage VREF1 have a relationship of "VREG1>NELVDD>VREF1". In an embodiment, the second voltage NELVDD output from the operational amplifier AP2 has the same voltage level as the first driving voltage ELVDD output from the power manager 300 illustrated in FIG. 3.

The first voltage VREG1, the second voltage NELVDD, and the third voltage VREF1 may be output to a third output terminal OUT3, a first node N1, and a fourth output terminal OUT4, respectively.

The circuit configuration of the first voltage generator 211 is not limited to the embodiment of FIG. 5 and may be variously changed.

The second voltage generator 212 receives the first voltage VREG1, the second voltage NELVDD, and the filtered driving voltage ELVDD-F and outputs the first reference voltage AVC_VREG1. The first reference voltage AVC_VREG1 may be output to the first output terminal OUT1.

The second voltage generator 212 includes resistors R1, R2, R3, and R4 and an operational amplifier AP4. The resistor R1 is connected between the third output terminal OUT3 and a first input terminal (+) of the operational amplifier AP4. The resistor R2 is connected between the first input terminal (+) of the operational amplifier AP4 and the second node N2. The resistor R3 is connected between the first node N1 and a second input terminal (−) of the operational amplifier AP4. The resistor R4 is connected between the second input terminal (−) of the operational amplifier AP4 and the first output terminal OUT1.

The first reference voltage AVC_VREG1 output from the second voltage generator 212 may be calculated by Equation 1 below.

$$AVC\_\mathrm{VREG1}=(\mathrm{ELVDD}\text{-}F-\mathrm{NELVDD})+\mathrm{VREG1} \quad \text{[Equation 1]}$$

The circuit configuration of the second voltage generator 212 is not limited to the embodiment of FIG. 5 and may be variously changed.

The third voltage generator 213 receives the second voltage NELVDD, the third voltage VREF1, and the filtered driving voltage ELVDD-F and outputs the second reference voltage AVC_VREF1. The second reference voltage AVC_VREF1 may be output to a second output terminal OUT2.

The third voltage generator 213 includes resistors R5, R6, R7, and R8 and an operational amplifier AP5. The resistor R5 is connected between the fourth output terminal OUT4 and a first input terminal (+) of the operational amplifier AP5. The resistor R6 is connected between the first input terminal (+) of the operational amplifier AP5 and the second node N2. The resistor R7 is connected between the first node N1 and a second input terminal (−) of the operational amplifier AP5. The resistor R8 is connected between the second input terminal (−) of the operational amplifier AP5 and the second output terminal OUT2.

The second reference voltage AVC_VREF1 output from the third voltage generator 213 may be calculated by Equation 2 below.

$$AVC\_VREF1=(ELVDD\text{-}F-NELVDD)+VREF1 \quad \text{[Equation 2]}$$

The circuit configuration of the third voltage generator 213 is not limited to the embodiment of FIG. 5 and may be variously changed.

The output circuit 220 outputs the data signal Di having a voltage level corresponding to the output image signal DS based on the first reference voltage AVC_VREG1 and the second reference voltage AVC_VREF1.

The output circuit 220 includes a resistor string 221, a digital-to-analog converter 222, and a buffer 223. The resistor string 221 may include a plurality of resistors connected between the first output terminal OUT1 and the second output terminal OUT2. For example, the resistors of the resistor string 221 may be connected in series with one another. The resistor string 221 may output voltages of connection nodes between a plurality of resistors as gamma reference voltages. For example, a node between each pair of the resistors may output a different one of the gamma reference voltages and the gamma reference voltages may have levels that are different from one another.

The digital-to-analog converter 222 receives the output image signal DS from the driving controller 100 shown in FIG. 3. The digital-to-analog converter 222 outputs the data signal Di corresponding to the output image signal DS corresponding to the i-th data line DLi among the plurality of gamma reference voltages from the resistor string 221. The buffer 223 outputs the data signal Di from the digital-to-analog converter 222 to the i-th data line DLi.

FIG. 5 illustrates that only the output circuit 220 outputs the data signal Di to the i-th data line DLi. However, the output circuit 220 may drive all of the data lines DL1 to DLn illustrated in FIG. 3 in the same method as a method of driving the i-th data line DLi.

As mentioned above, a voltage level of the data signal Di output from the output circuit 220 may correspond to the output image signal DS. However, the voltage level of the data signal Di may be changed depending on voltage levels of the first reference voltage AVC_VREG1 and the second reference voltage AVC_VREF1.

As can be observed from Equation 1 and Equation 2, the second voltage generator 212 and the third voltage generator 213 may output the first reference voltage AVC_VREG1 and the second reference voltage AVC_VREF1 based on the filtered driving voltage ELVDD-F, respectively.

In an embodiment, the second voltage NELVDD has the same voltage level as the first driving voltage ELVDD output from the power manager 300 illustrated in FIG. 3. However, the first driving voltage ELVDD provided to the display panel DP and the data driving circuit DDC may be changed to a voltage level different from the first driving voltage ELVDD output from the power manager 300 by a voltage drop in the display panel DP, a contact resistor between the flexible circuit board FCB and the display panel DP, and the like. In this case, a difference occurs between the second voltage NELVDD and the first driving voltage ELVDD, which is actually provided to the display panel DP and the data driving circuit DDC.

The second voltage generator 212 and the third voltage generator 213 receive the filtered driving voltage ELVDD-F and respectively output the first reference voltage AVC_VREG1 and the second reference voltage AVC_VREF1 based on the filtered driving voltage ELVDD-F. That is, the second voltage generator 212 and the third voltage generator 213 may generate the first reference voltage AVC_VREG1 and the second reference voltage AVC_VREF1, by reflecting a voltage level of the filtered driving voltage ELVDD-F obtained by removing noise from the first driving voltage ELVDD substantially provided to the display panel DP. Thus the display quality of an image displayed on the display panel DP may be prevented from deteriorating.

Figure 6A:
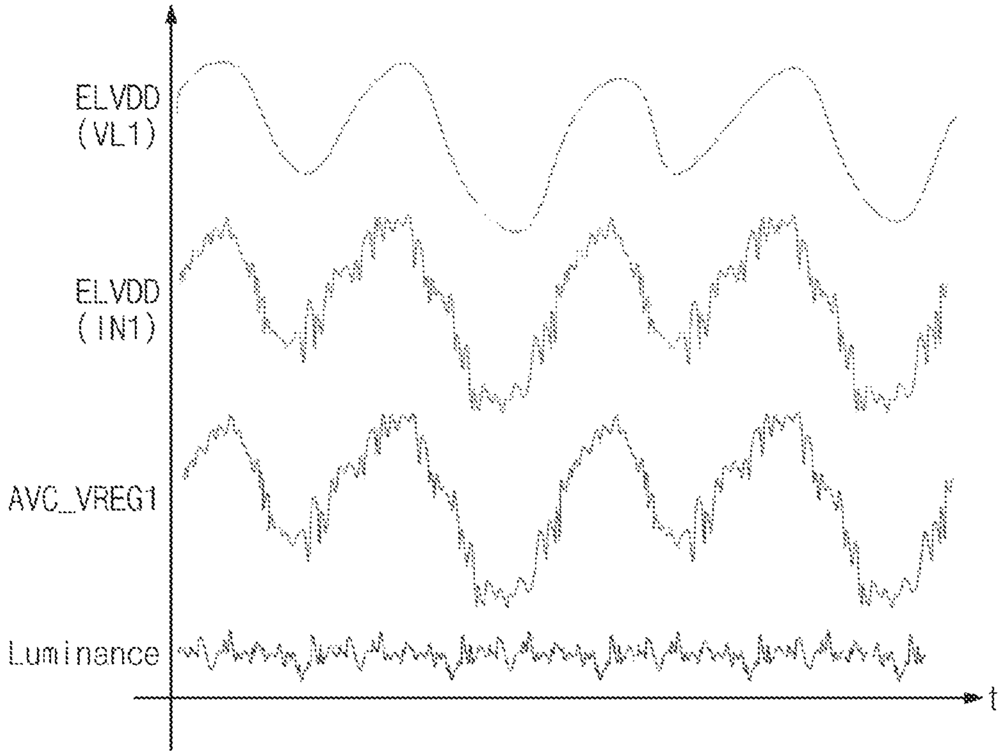
FIGS. 6A and 6B are diagrams illustrating a change in a voltage level of a first reference voltage according to a voltage level of a first driving voltage.
Figure 6B:
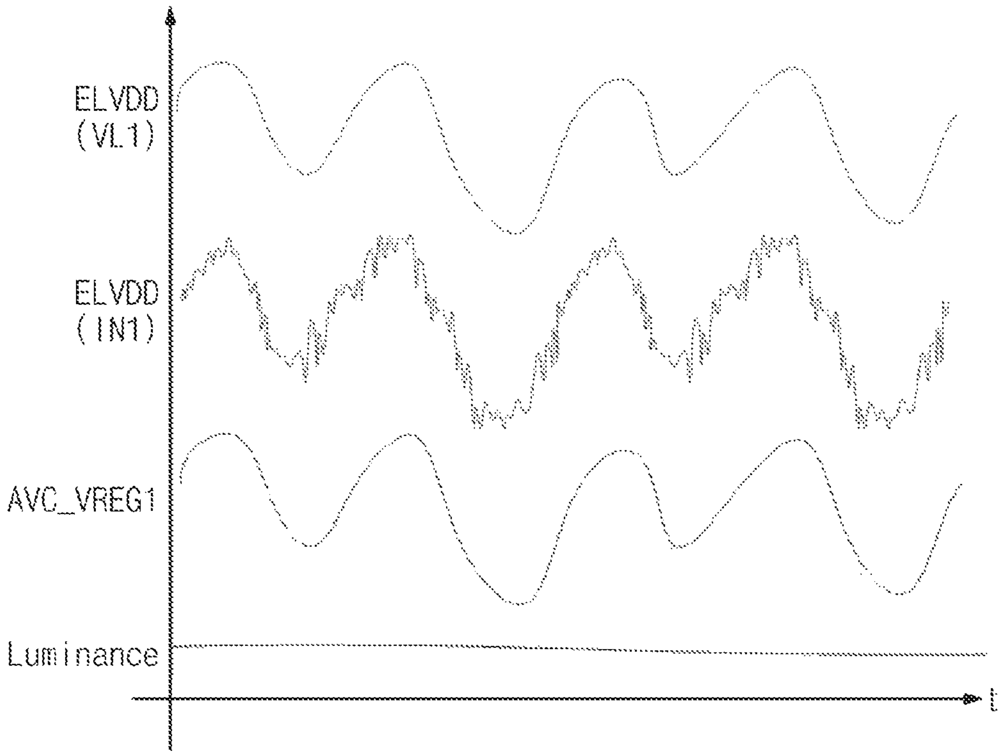

FIGS. 6A and 6B are diagrams illustrating a change in a voltage level of the first reference voltage AVC_VREG1 according to a voltage level of a first driving voltage.

Referring to FIGS. 3, 5 and 6A, the first driving voltage ELVDD generated by the power manager 300 may be provided to the data driving circuit DDC and the display panel DP.

As shown in FIG. 4, the first driving voltage ELVDD provided to the display panel DP may be provided to the pixel PXij through the first driving voltage line VL1. The first driving voltage line VL1 extends in the first direction DR1 and/or the second direction DR2, and high-frequency noise may be reduced by wiring resistors and capacitance components.

However, the first driving voltage ELVDD provided directly from the power manager 300 to the input terminal IN1 of the data driving circuit DDC may include a noise component (e.g., ripple).

When the reference voltage generator 210 does not include the noise filter NC1, the first driving voltage ELVDD may be provided directly to the second voltage generator 212.

In this case, the noise component included in the first driving voltage ELVDD may be delivered to the first input terminal (+) of the operational amplifier AP4 in the second voltage generator 212. Accordingly, the first reference voltage AVC_VREG1 output from the operational amplifier AP4 may include a noise component similar to the first driving voltage ELVDD.

When the reference voltage generator 210 does not include the noise filter NC1, the first driving voltage ELVDD may be provided directly to the third voltage generator 213. In this case, although not shown in FIG. 6A, the second reference voltage AVC_VREF1 may also include a noise component similar to that of the first driving voltage ELVDD.

Because the output circuit 220 outputs the data signal Di based on the first reference voltage AVC_VREG1 and the second reference voltage AVC_VREF1, the voltage level of the data signal Di may be changed when the first reference voltage AVC_VREG1 and the second reference voltage AVC_VREF1 including noise components. When the voltage level of the data signal Di is changed even though the same output data signal DS is input to the output circuit 220, the luminance of the image displayed on the display panel DP may be changed.

The reference voltage generator 210 illustrated in FIG. 5 includes the noise filter NC. The noise filter NC1 may output the filtered driving voltage ELVDD-F obtaining by removing high-frequency components included in the first driving voltage ELVDD. Because the filtered driving voltage ELVDD-F is provided to the first input terminal (+) of the operational amplifier AP4, the first reference voltage AVC_VREG1 output from the operational amplifier AP4 is not affected by the noise component of the first driving voltage ELVDD.

Likewise, because the filtered driving voltage ELVDD-F is provided to the first input terminal (+) of the operational amplifier AP5, the second reference voltage AVC_VREF1 output from the operational amplifier AP5 is not affected by the noise component of the first driving voltage ELVDD.

Accordingly, as shown in FIG. 6B, even though the first driving voltage ELVDD includes noise components, the luminance of an image displayed on the display panel DP may be maintained at a stable level.

Figure 7:
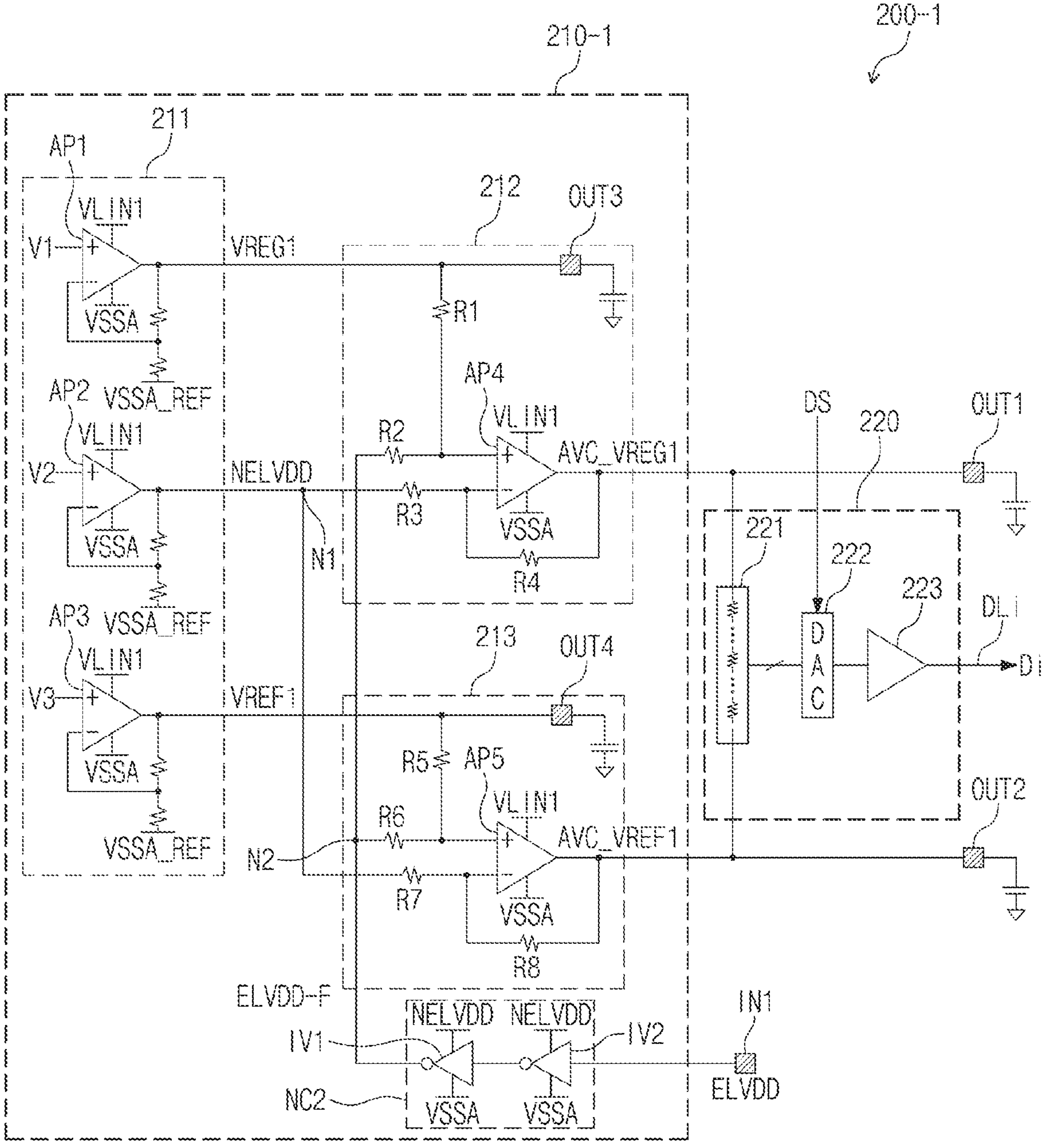
FIG. 7 is a circuit diagram of a data driving circuit, according to an embodiment of the present disclosure.

FIG. 7 is a circuit diagram of a data driving circuit, according to an embodiment of the present disclosure.

A data driving circuit 200-1 shown in FIG. 7 has a configuration similar to the data driving circuit 200 shown in FIG. 5 other than a noise filter NC2. Accordingly, the same reference numerals are used for the same circuit configurations, and additional descriptions are omitted to avoid redundancy. The data driving circuit 200-1 may be used to implement the data driving circuit DDC of FIG. 3.

The data driving circuit 200-1 illustrated in FIG. 7 includes a reference voltage generator 210-1 and an output circuit 220. The reference voltage generator 210-1 includes the noise filter NC2, the first voltage generator 211, the second voltage generator 212, and the third voltage generator 213.

The noise filter NC2 receives the first driving voltage ELVDD and outputs the filtered driving voltage ELVDD-F. In an embodiment, the noise filter NC2 outputs the filtered driving voltage ELVDD-F by removing high-frequency components included in the first driving voltage ELVDD. For example, components included in the first driving voltage ELVDD greater than a certain frequency or frequency range may be removed or attenuated by the noise filter NC2. In an embodiment, the noise filter NC2 is implemented by a low pass filter.

The noise filter NC2 may include inverters IV1 and IV2 (e.g., inverter circuits). The inverters IV1 and IV2 are connected in series between the second node N2 and the input terminal IN1. That is, the inverter IV2 receives the first driving voltage ELVDD received from the input terminal IN1. The output of inverter IV2 is provided as an input to the inverter IV1. The inverter IV1 receives an output of the inverter IV2 and outputs the filtered driving voltage ELVDD-F.

The inverters IV1 and IV2 may receive the second voltage NELVDD and the voltage VSSA. In an embodiment, each of the inverters IV1 and IV2 may be an operational amplifier (or an inverting amplifier). For example, the second voltage NELVDD and the voltage VSSA may be applied to power supply terminals of the inverters IV1 and IV2.

The inverters IV1 and IV2 may output the filtered driving voltage ELVDD-F obtaining by removing high-frequency components included in the first driving voltage ELVDD.

The circuit configuration of the noise filter NC2 is not limited to the embodiment of FIG. 7 and may be variously changed.

Figure 8:
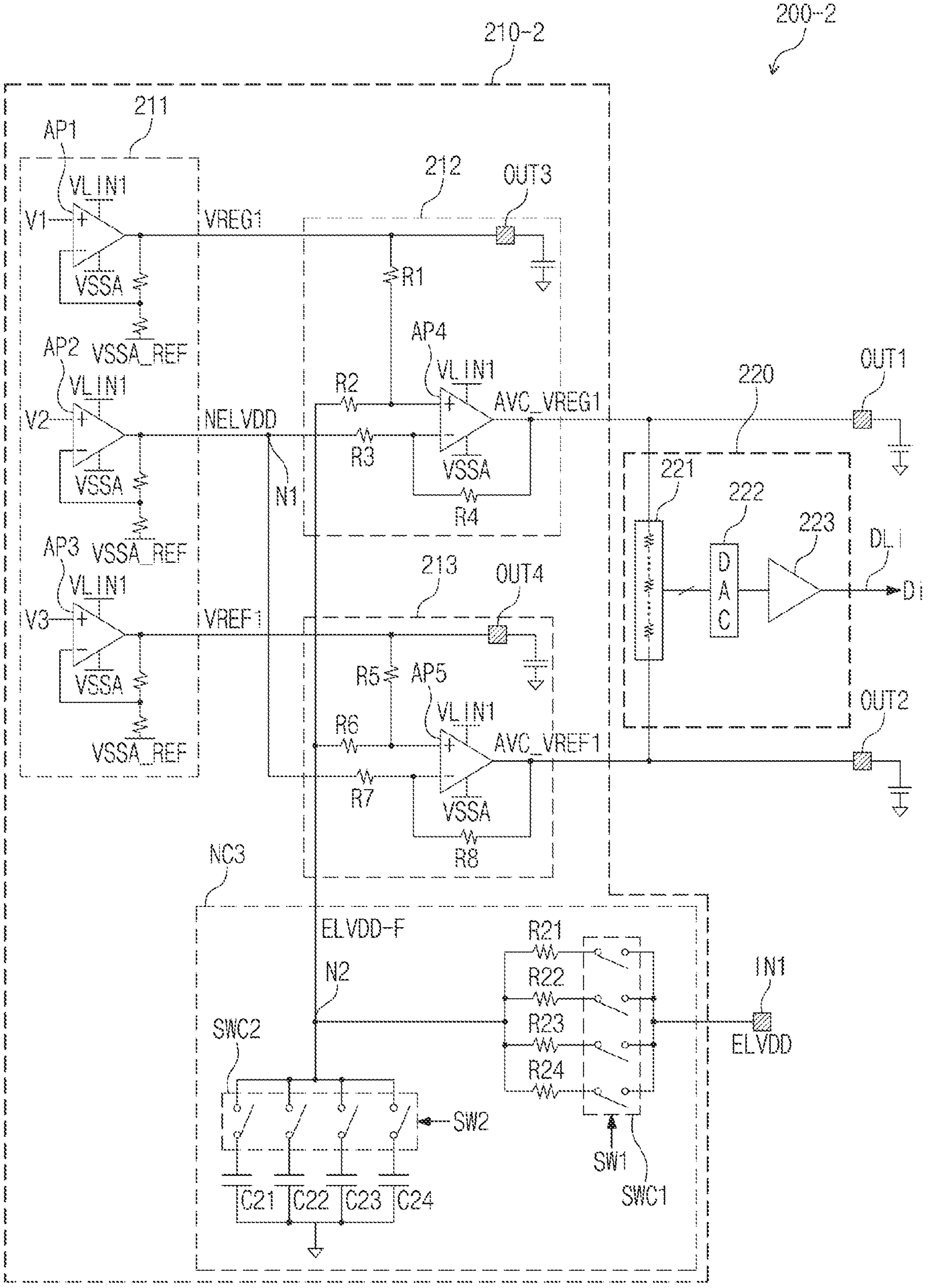
FIG. 8 is a circuit diagram of a data driving circuit, according to an embodiment of the present disclosure.

FIG. 8 is a circuit diagram of a data driving circuit, according to an embodiment of the present disclosure.

A data driving circuit 200-2 shown in FIG. 8 has a configuration similar to the data driving circuit 200 shown in FIG. 5 other than a noise filter NC3. Accordingly, the same reference numerals are used for the same circuit configurations, and additional descriptions are omitted to avoid redundancy. The data driving circuit 200-2 may be used to implement the data driving circuit DDC of FIG. 3.

The data driving circuit 200-2 illustrated in FIG. 8 includes a reference voltage generator 210-2 and the output circuit 220. The reference voltage generator 210-2 includes the noise filter NC3, the first voltage generator 211, the second voltage generator 212, and the third voltage generator 213.

The noise filter NC3 receives the first driving voltage ELVDD and outputs the filtered driving voltage ELVDD-F. In an embodiment, the noise filter NC3 outputs the filtered driving voltage ELVDD-F by removing high-frequency components included in the first driving voltage ELVDD. For example, components included in the first driving voltage ELVDD greater than a certain frequency or frequency range may be removed or attenuated by the noise filter NC3.

The noise filter NC3 may include a first switching circuit SWC1, resistors R21, R22, R23, and R24, a second switching circuit SWC2, and capacitors C21, C22, C23, and C24.

In an embodiment, the first switching circuit SWC1 selects at least one of the resistors R21, R22, R23, and R24 in response to the first switching signal SW1 so as to be connected between the input terminal IN1 and the second node N2. In an embodiment, the resistors R21, R22, R23, and R24 have different resistance values from one another. In an embodiment, the resistors R21, R22, R23, and R24 have the same resistance as one another.

The second switching circuit SWC2 selects at least one of the capacitors C21, C22, C23, and C24 in response to the second switching signal SW2 so as to be connected between the second node N2 and a ground terminal. In an embodiment, the capacitors C21, C22, C23, and C24 have different capacitances from one another. In an embodiment, the capacitors C21, C22, C23, and C24 have the same capacitance as one another.

A cut-off frequency of the noise filter NC3 may be determined depending on a resistance value of the resistor(s) connected between the input terminal IN1 and the second node N2 and capacitance of the capacitor(s) connected between the second node N2 and the ground terminal. In an embodiment, the cut-off frequency is inversely proportional to a product of the resistance value (referred to as "R") and the capacitance (referred to as "C"), that is, "R×C".

Accordingly, the resistance values of the resistors R21, R22, R23, and R24 and the capacitances of the capacitors C21, C22, C23, and C24 are set to be suitable for the characteristics of the display device DD. In an embodiment, at least one of the resistors R21, R22, R23, and R24 is connected between the input terminal IN1 and the second node N2 via the first switching circuit SWC1; and, at least one of the capacitors C21, C22, C23, and C24 is connected between the second node N2 and the ground terminal via the second switching circuit SWC2.

While FIG. 8 shows a single signal SW1 being applied to the first switching circuit SWC1, in an embodiment this single signal may be replaced with a distinct switching signal for each of the internal switches of the first switching circuit SWC1 so that one or more of the internal switches may open while one or more remaining switches may be closed. While FIG. 8 shows a single signal SW2 being applied to the second switching circuit SWC2, in an embodiment this single signal may be replaced with a distinct switching signal for each of the internal switches of the second switching circuit SWC2 so that one or more of the internal switches may be opened while one or more remaining switches may be closed. Thus, the cutoff frequency of the noise filter NC3 may be adjusted by differently closing and opening internal switches of the switching circuits SWC1 and SWC2.

Figure 9:
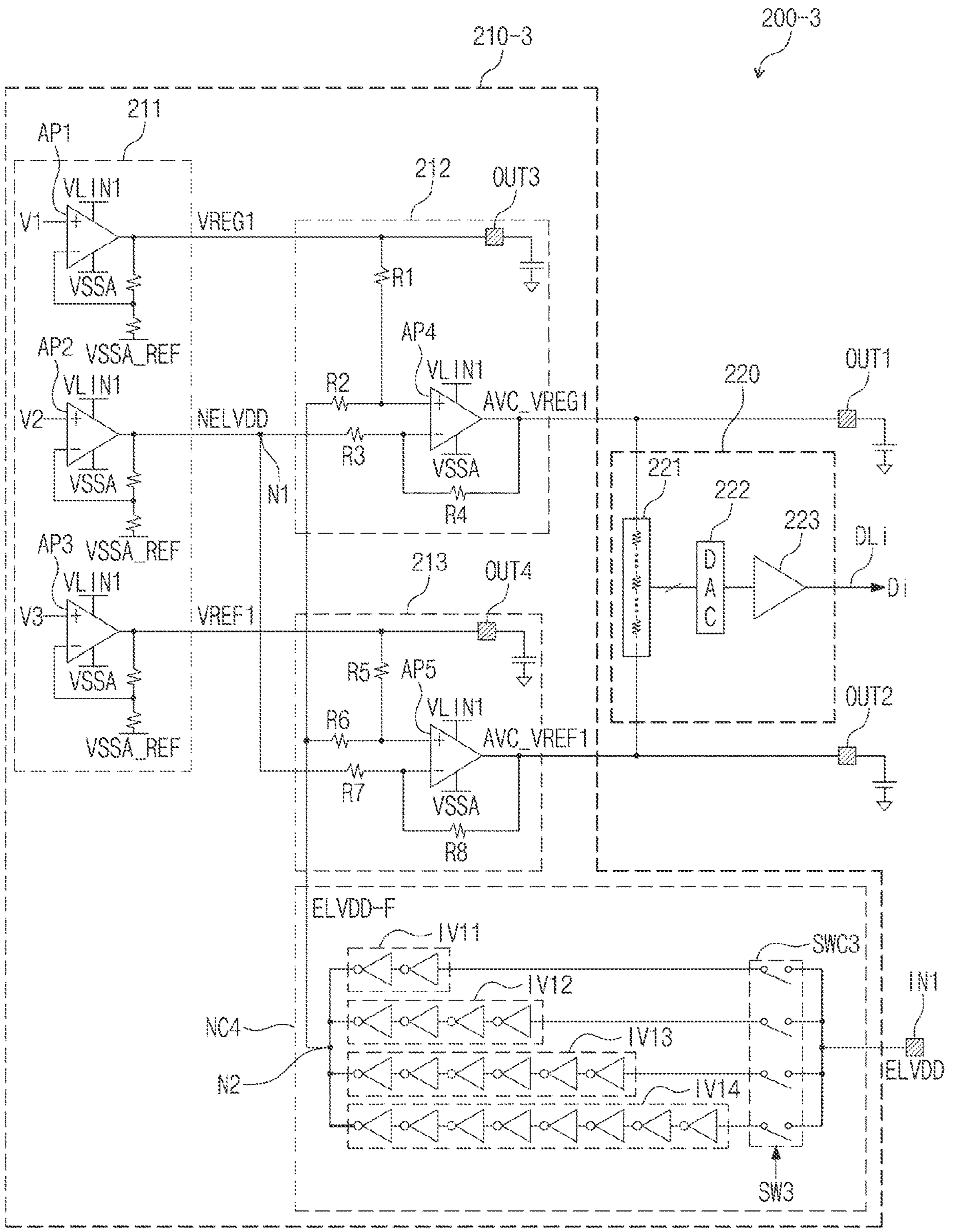
FIG. 9 is a circuit diagram of a data driving circuit, according to an embodiment of the present disclosure.

FIG. 9 is a circuit diagram of a data driving circuit, according to an embodiment of the present disclosure.

A data driving circuit 200-3 shown in FIG. 9 has a configuration similar to the data driving circuit 200 shown in FIG. 5 other than a noise filter NC4. Accordingly, the same reference numerals are used for the same circuit configurations, and additional descriptions are omitted to avoid redundancy. The data driving circuit 200-3 may be used to implement the data driving circuit DDC of FIG. 3.

The data driving circuit 200-3 illustrated in FIG. 9 includes a reference voltage generator 210-3 and the output circuit 220. The reference voltage generator 210-3 includes the noise filter NC4, the first voltage generator 211, the second voltage generator 212, and the third voltage generator 213.

The noise filter NC4 receives the first driving voltage ELVDD and outputs the filtered driving voltage ELVDD-F. In an embodiment, the noise filter NC4 outputs the filtered driving voltage ELVDD-F by removing high-frequency components included in the first driving voltage ELVDD. For example, components included in the first driving voltage ELVDD greater than a certain frequency or frequency range may be removed or attenuated by the noise filter NC4.

The noise filter NC4 may include inverter strings IV11, IV12, IV13, and IV14 and a third switching circuit SWC3.

In an embodiment, the inverter strings IV11, IV12, IV13, and IV14 include a different numbers of inverters. For example, the inverter strings IV11, IV12, IV13, and IV14 may include 2, 4, 6, and 8 inverters, respectively. Inverters included in each of the inverter strings IV11, IV12, IV13, and IV14 may be sequentially connected in series between the second node N2 and the third switching circuit SWC3.

Each of the inverters in the inverter strings IV11, IV12, IV13, and IV14 may receive the second voltage NELVDD and the voltage VSSA in the same manner as the inverters IV1 and IV2 shown in FIG. 7.

In an embodiment, the third switching circuit SWC3 selects one of the inverter strings IV11, IV12, IV13, and IV14 in response to the third switching signal SW3 so as to be connected between the input terminal IN1 and the second node N2.

As the number of inverters included in each of the inverter strings IV11, IV12, IV13, and IV14 increases, a resistance value and capacitance may increase and thus the cut-off frequency may be lowered. For example, a cut-off frequency of the inverter string IV12 is lower than that of the inverter string IV11.

The display device DD may output the third switching signal SW3 such that one or at least one of the inverter strings IV11, IV12, IV13, and IV14 is connected to the input terminal IN1 and the second node N2 depending on the required cut-off frequency.

The circuit configuration of the noise filter NC4 is not limited to the embodiment of FIG. 9 and may be variously changed.

At least one embodiment of the disclosure provides a display device configured to generate a reference voltage in conjunction with a driving voltage that is suitable for a display panel. In particular, after noise components included in the driving voltage provided to the display panel from a power manager are filtered out to generate a filtered driving voltage, the reference voltage is generated from the filtered driving voltage, and thus display quality may be prevented from deteriorating.

In at least one embodiment of the disclosure, a data driving circuit of a display device filters noise from a driving voltage before using it to generate a data signal that is applied to a pixel of the display device. The data driving circuit generates a first reference voltage based on a sum of a first voltage and a difference between the filtered driving voltage and a second other voltage, generates a second reference voltage based on a sum of a third other voltage and the difference, and generates the data signal based on image data and the two reference voltages.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A data driving circuit comprising:

a reference voltage generator configured to generate a first reference voltage and a second reference voltage; and an output circuit configured to output a data signal of a voltage level corresponding to an image signal based on the first reference voltage and the second reference voltage, wherein the reference voltage generator comprises:

a noise filter configured to receive a driving voltage and remove a noise from the driving voltage to output a filtered driving voltage;

a first voltage generator configured to output a first voltage, a second voltage, and a third voltage;

a second voltage generator configured to generate the first reference voltage based on the filtered driving voltage, the first voltage, and the second voltage; and a third voltage generator configured to generate the second reference voltage based on the filtered driving voltage, the second voltage, and the third voltage.

2. The data driving circuit of claim 1, wherein the output circuit comprises:

a resistor string configured to output a plurality of gamma reference voltages;

a digital-to-analog converter configured to output the data signal corresponding to the image signal among the plurality of gamma reference voltages from the resistor string, and a buffer outputs the data signal from the digital-to-analog converter to a data line.

3. The data driving circuit of claim 1, wherein the noise filter comprises:

a resistor connected between an input terminal for receiving the driving voltage and an output node at which the filtered driving voltage is output; and a capacitor connected between the output node and a ground terminal.

4. The data driving circuit of claim 1, wherein the second voltage generator comprises:

an operational amplifier including a first input terminal and a second input terminal;

a first resistor connected between the first input terminal and a first voltage output terminal at which the first voltage is output;

a second resistor connected between the first input terminal and an output node at which the filtered driving voltage is output;

a third resistor connected between the second input terminal and a first node at which the second voltage is output; and a fourth resistor connected between the second input terminal and a first reference voltage output terminal.

5. The data driving circuit of claim 1, wherein the third voltage generator comprises:

an operational amplifier including a first input terminal and a second input terminal;

a fifth resistor connected between the first input terminal and a third voltage output terminal at which the third voltage is output;

a sixth resistor connected between the first input terminal and an output node at which the filtered driving voltage is output;

a seventh resistor connected between the second input terminal and a first node at which the second voltage is output; and an eighth resistor connected between the second input terminal and a second reference voltage output terminal.

6. The data driving circuit of claim 1, wherein the noise filter comprises:

a plurality of inverters connected between an input terminal for receiving the driving voltage and an output node at which the filtered driving voltage is output.

7. The data driving circuit of claim 1, wherein the noise filter comprises:

a plurality of resistors;

a first switching circuit configured to select at least one of the plurality of resistors so as to be connected between an input terminal for receiving the driving voltage and an output node at which the filtered driving voltage is output;

a plurality of capacitors; and a second switching circuit configured to select at least one of the plurality of capacitors so as to be connected between a ground terminal and the output node at which the filtered driving voltage is output.

8. The data driving circuit of claim 1, wherein the noise filter comprises:

a plurality of inverter strings; and a switching circuit configured to select at least one of the plurality of inverter strings so as to be connected between an input terminal for receiving the driving voltage and an output node at which the filtered driving voltage is output.

9. The data driving circuit of claim 8, wherein each of the plurality of inverter strings includes a plurality of inverters sequentially connected in series, and wherein each of the plurality of inverter strings includes different numbers of the plurality of inverters.

10. A display device comprising:

a display panel including a pixel connected to a scan line and a data line;

a scan driving circuit configured to drive the scan line;

a data driving circuit configured to receive an image signal and to output a data signal corresponding to the image signal to the data line;

a driving controller configured to control the scan driving circuit and the data driving circuit and to output the image signal; and a power manager configured to provide a driving voltage to the display panel and the data driving circuit, wherein the data driving circuit comprises:

a reference voltage generator configured to generate a first reference voltage and a second reference voltage; and an output circuit configured to output the data signal based on the first reference voltage and the second reference voltage, wherein the reference voltage generator comprises:

a noise filter configured to receive a driving voltage and remove a noise from the driving voltage to output a filtered driving voltage;

a first voltage generator configured to output a first voltage, a second voltage, and a third voltage;

a second voltage generator configured to generate the first reference voltage based on the filtered driving voltage, the first voltage, and the second voltage; and a third voltage generator configured to generate the second reference voltage based on the filtered driving voltage, the second voltage, and the third voltage.

11. The display device of claim 10, wherein the output circuit comprises:

a resistor string configured to output a plurality of gamma reference voltages;

a digital-to-analog converter configured to output the data signal corresponding to the image signal among the plurality of gamma reference voltages from the resistor string, and a buffer outputs the data signal from the digital-to-analog converter to a data line.

12. The display device of claim 10, wherein the noise filter comprises:

a resistor connected between an input terminal for receiving the driving voltage and an output node at which the filtered driving voltage is output; and a capacitor connected between the output node and a ground terminal.

13. The display device of claim 10, wherein the second voltage generator comprises:

an operational amplifier including a first input terminal and a second input terminal;

a first resistor connected between the first input terminal and an output terminal at which the first voltage is output;

a second resistor connected between the first input terminal and an output node at which the filtered driving voltage is output;

a third resistor connected between the second input terminal and a first node at which the second voltage is output; and a fourth resistor connected between the second input terminal and a first reference voltage output terminal.

14. The display device of claim 10, wherein the third voltage generator comprises:

an operational amplifier including a first input terminal and a second input terminal;

a fifth resistor connected between the first input terminal and a third voltage output terminal at which the third voltage is output;

a sixth resistor connected between the first input terminal and an output node at which the filtered driving voltage is output;

a seventh resistor connected between the second input terminal and a first node at which the second voltage is output; and an eighth resistor connected between the second input terminal and a second reference voltage output terminal.

15. The display device of claim 10, wherein the noise filter comprises:

a plurality of resistors;

a first switching circuit configured to select at least one of the plurality of resistors so as to be connected between an input terminal for receiving the driving voltage and an output node at which the filtered driving voltage is output;

a plurality of capacitors; and a second switching circuit configured to select at least one of the plurality of capacitors so as to be connected between a ground terminal and the output node at which the filtered driving voltage is output.

16. The display device of claim 10, wherein the noise filter comprises:

a plurality of inverter strings; and a switching circuit configured to select at least one of the plurality of inverter strings so as to be connected between an input terminal for receiving the driving voltage and an output node at which the filtered driving voltage is output.

17. The display device of claim 16, wherein each of the plurality of inverter strings includes a plurality of inverters sequentially connected in series, and wherein each of the plurality of inverter strings includes different numbers of the plurality of inverters.

18. The display device of claim 10, further comprising:

a flexible circuit board electrically connected to the display panel, wherein the driving controller and the power manager are disposed on the flexible circuit board.

19. The display device of claim 10, wherein a level of the first reference voltage is a sum of the first voltage and a difference between the filtered driving voltage and the second voltage, and wherein a level of the second reference voltage is a sum of the third voltage and the difference.

20. The display device of claim 10, wherein the pixel comprises:

a light emitting element;

a first transistor connected between a first electrode, which is electrically connected to a first driving voltage line for receiving the driving voltage, and a second electrode electrically connected to the light emitting element; and a second transistor connected between the data line and the first electrode of the first transistor and including a gate electrode connected to the scan line.

* * * * *